May 22, 1956     L. LAUBENDER     2,746,446
MEANS FOR PREVENTING THE FLOW OF LUBRICATING OIL
INTO THE EXHAUST PORTS OF DIESEL ENGINES
Filed July 24, 1953

INVENTOR
LUDWIG LAUBENDER

By Richardson, David and Nordon
his ATTYS.

United States Patent Office 2,746,446
Patented May 22, 1956

2,746,446
MEANS FOR PREVENTING THE FLOW OF LUBRICATING OIL INTO THE EXHAUST PORTS OF DIESEL ENGINES

Ludwig Laubender, Traustein, Germany, assignor to Fa. Krauss-Maffei A. G., Munchen-Allach, Germany Application July 24, 1953, Serial No. 370,031

Claims priority, application Germany July 28, 1952

2 Claims. (Cl. 123—193)

The present invention relates to means for preventing the flow of lubricating oil into the exhaust ports of diesel engines, and more particularly diesel engines of the two-cycle type.

In order to reduce the sliding friction of the piston rings on the cylinder wall, the latter must be continuously lubricated. For this purpose a lubrication inlet is provided in the cylinder wall located outside of the working combustion space from which lubricant is continuously fed to the cylinder. The lubricant is distributed uniformly over the entire cylinder wall by the piston rings of the reciprocating piston which slides over the inlet for the cylinder lubricating oil. Upon the passage of the piston rings of the working piston over the exhaust ports, a certain quantity of the lubricating oil adheres to the edges of the ports and is carried into the exhaust ports by the reciprocating action of the piston rings. An additional quantity of lubricant is carried into the exhaust ports by the scavenging air, namely when the piston covers the exhaust ports in such a manner that they communicate with annular space defined by the space between the piston skirt and the cylinder wall and is closed at the top by the sealing rings in the upper part of the piston and at the bottom by the oil scraper rings in the lower part of the piston. The pressure differential between the scavenging air pressure in the scavenging ports and the outer air pressure prevailing in the exhaust ports produces a flow of air which is directed from the scavenging ports to the exhaust ports and which carries along into the exhaust ports a certain amount of the lubricating oil on the cylinder wall. The action of the hot exhaust gases converts this oil into carbon which accumulates in the port opening and gradually decreases the effective cross sectional area of the port opening over a prolonged period of operation of the diesel engine, and this carbon deposit impairs the action and reduces the power of the engine.

The purpose of the present invention is to prevent the carrying of the lubricating oil into the exhaust ports by the charging air.

The problem is solved by providing grooves formed in the cylinder wall located intermediate the scavenging and exhaust ports by which the lubricating oil carried along by the flow of charging air is captured and diverted to the crankcase so that the oil cannot pass beyond the grooves and into the exhaust ports.

By means of these grooves, the formation of deposits of oil carbon is substantially reduced, particularly on the side walls of the exhaust ports.

An embodiment of the invention is diagrammatically shown in the accompanying drawing in which.

Figure 1:
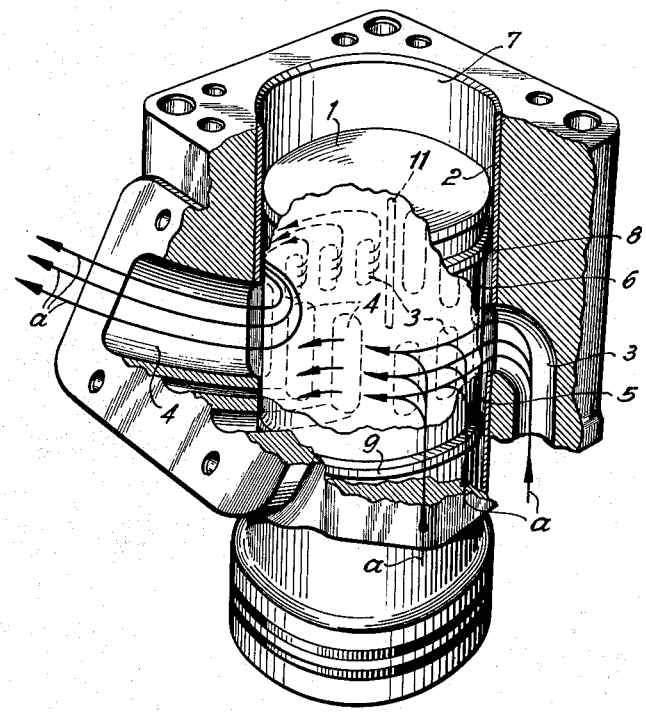
Figure 1 is a perspective view of an engine cylinder broken away to show the piston.
Figure 2:
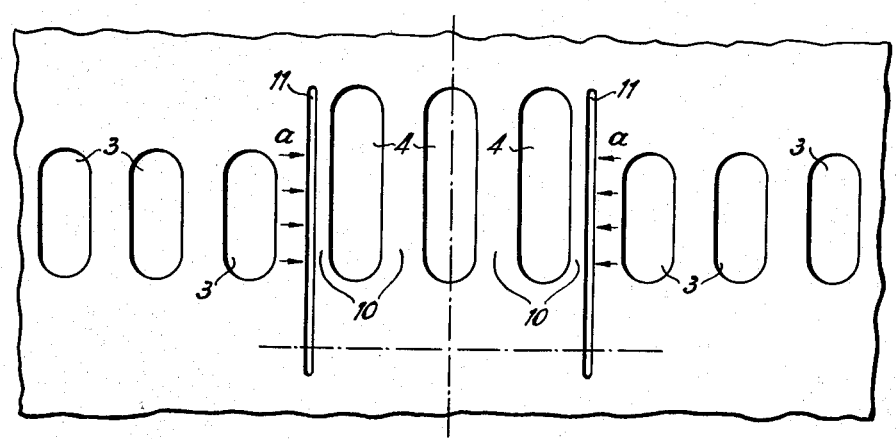
Figure 2 is a development of the cylinder wall showing the oil blocking grooves formed in the cylinder wall and located between the scavenging and exhaust ports.

The piston 1 of a port-controlled two-cycle diesel engine covers the scavenging ports 3 and the exhaust ports 4 in the cylinder wall 2 during a relatively long portion of its stroke. During this interval the scavenging ports 3 discharge into circumferential annular space 5 of rectangular cross section, the lateral surfaces of which are formed by the piston skirt surface 6 and the cylinder wall 7, the upper and lower end surfaces of which are formed by the sealing ring 8 and the oil wiper ring 9. The annular space 5 forms a circumferential air flow path around the piston 1. Due to the pressure differential between the charging air 8 flowing through the scavenging ports 3 and the approximately atmospheric air pressure prevailing in the exhaust ports, air flows through this annular space around the piston 1 from the scavenging ports 3 to the exhaust ports 4 as indicated by the arrows $a$ in the drawing. This air flow carries with it some of the lubricating oil adhering to the cylinder wall and this oil passes into the exhaust ports 4 in which it becomes coked by the action of the hot exhaust gases and a carbon deposit gradually accumulates, causing a clogging of the exhaust ports 4. In order to avoid this clogging of the exhaust ports the present invention provides vertical oil blocking grooves 11 which extend transversely with respect to the air flow and therefore axially with respect to the cylinder. The oil blocking grooves 11 are formed in walls 10 of the cylinder 2 and are located between the scavenging ports 3 and the exhaust ports 4, and the oil blocking grooves 11 extend downwardly from about the height of the upper edge of the exhaust ports 4 near the combustion space and terminating at a portion of the cylinder wall 10 which is below the lower edge of the piston 1, when the piston is at its upper dead center postion or upper limit of its stroke. By means of this arrangement the lubricant carried along by the scavenging air is prevented from entering the exhaust ports 4, being captured in the oil blocking grooves 11 and diverted downwardly therein to a portion of the cylinder below the piston 1 from which its blown into the crankcase.

Having thus described my invention, what I desire to secure by Letters Patent of the United States is the invention as defined in the appended claims.

What is claimed is:

1. Oil flow preventing means of the class described, for use in a two-cycle diesel engine, said engine comprising: a hollow cylinder having lubricating oil supplied to the internal wall thereof; and a piston reciprocably mounted in said cylinder, said piston having a circumferential air flow path therearound, said cylinder having at least one exhaust port aperture and at least one scavenging port aperture formed side by side in the wall thereof, air under pressure being supplied to said scavenging port aperture, said apertures being positioned to be closed by said piston during a portion of its stroke, said cylinder wall further having a longitudinally extending oil flow blocking groove formed vertically therein intermediate said exhaust and scavenging port apertures and lying substantially in a single plane, said groove constituting said oil flow preventing means for preventing air, flowing from said scavenging port aperture to said exhaust port aperture in said circumferential path, from carrying said lubricating oil into said exhaust port by capturing said oil in said groove and draining said oil in a downward direction.

2. Oil flow preventing means according to claim 1, including a crankcase wherewith said cylinder communicates, and in which said groove extending axially of said cylinder terminates inferiorly to said piston toward said cranckcase when said piston is at the upper limit of its stroke, whereby oil captured in said groove is blown into said crankcase by compressed gas emanating from said scavenging port aperture.

References Cited in the file of this patent
UNITED STATES PATENTS

| | | |
|---|---|---|
| 1,596,897 | Siegler | Aug. 24, 1926 |
| 2,547,957 | Meadows | Apr. 10, 1951 |

FOREIGN PATENTS

| | | |
|---|---|---|
| 483,514 | Great Britain | Apr. 21, 1938 |
| 678,084 | Great Britain | Aug. 27, 1952 |